United States Patent [19]
Young

[11] Patent Number: 5,869,791
[45] Date of Patent: Feb. 9, 1999

[54] METHOD AND APPARATUS FOR A TOUCH SENSING DEVICE HAVING A THIN FILM INSULATION LAYER ABOUT THE PERIPHERY OF EACH SENSING ELEMENT

[75] Inventor: Nigel D. Young, Redhill, England

[73] Assignee: U.S. Philips Corporation, New York, N.Y.

[21] Appl. No.: 609,876

[22] Filed: Mar. 1, 1996

[30] Foreign Application Priority Data

Apr. 18, 1995 [GB] United Kingdom .................. 9507817

[51] Int. Cl.⁶ .............................. G08C 21/00; G09G 5/00
[52] U.S. Cl. .................................... 178/20.01; 178/18.01; 178/18.03; 178/18.09; 345/174; 345/175
[58] Field of Search .................................... 345/173, 174, 345/175; 178/18.01, 18.03, 18.05, 18.07, 18.09, 19.03, 20.01

[56] References Cited

U.S. PATENT DOCUMENTS

| | | | |
|---|---|---|---|
| 4,220,815 | 9/1980 | Gibson | 178/18 |
| 4,371,746 | 2/1983 | Pepper, Jr. | 178/18 |
| 4,622,347 | 11/1986 | Bloom | 178/18 |
| 4,704,501 | 11/1987 | Taguchi et al. | 345/173 |
| 4,745,240 | 5/1988 | Furukawa et al. | 178/18 |
| 4,875,378 | 10/1989 | Yamazaki | 345/173 |
| 4,882,582 | 11/1989 | Oka | 345/173 |
| 5,157,227 | 10/1992 | McDermott | 178/19 |
| 5,220,136 | 6/1993 | Kent | 178/18 |
| 5,521,336 | 5/1996 | Buchanan | 178/20 |
| 5,554,828 | 9/1996 | Primm | 178/18 |

*Primary Examiner*—Vijay Shankar
*Attorney, Agent, or Firm*—Bernard Franzblau

[57] ABSTRACT

A touch sensing device comprising a plurality of individually operable touch sensing elements having first and second overlapping and spaced conductive layers (12, 15) with the second conductive layer being displaceable towards the first conductive layer in response to a touch input. The device is fabricated by forming on a support a thin film multi-layer structure comprising the first and second conductive layers with an insulating layer (16) therebetween and in which the second conductive layer is provided with apertures at predetermined regions, and subjecting the structure to an etching process which removes insulating material between the conductive layers at the apertured regions via the apertures to form gaps (19). This leaves the second conductive layer (15) at each region supported in spaced relationship to the first conductive layer by the insulating layer around the periphery of the region. The device may be used, for example, as a keypad or, with larger numbers of elements arranged in a row and column matrix, as a graphics tablet or display overlay and operated with a stylus. The device can conveniently be integrated with a liquid crystal display panel using a substsrate of the panel as the support.

21 Claims, 3 Drawing Sheets

METHOD AND APPARATUS FOR A TOUCH SENSING DEVICE HAVING A THIN FILM INSULATION LAYER ABOUT THE PERIPHERY OF EACH SENSING ELEMENT

BACKGROUND OF THE INVENTION

This invention relates to touch sensing devices having a plurality of touch sensing elements, each comprising first and second overlapping electrically conductive layers carried on a common support and in which the second electrode is spaced from the first electrode and is adapted to be displaced toward the first electrode in response to a touch input, and to methods of making such devices.

Touch sensing devices of the above kind can be used, for example, as user operable touch switches on electrical appliances or electronic equipment or in a keypad operable by a user's finger or other input element. Touch sensing arrays, comprising a large number of touch sensing elements arranged, for example, in a row and column matrix array, can be used as overlays for the display screen of a CRT, liquid crystal, or other display system providing a user interface through which inputs to the system, such as control commands, can be entered by touching appropriate touch sensing elements in the array. Similarly, an array of touch sensing elements can be used as a graphics tablet or like input device to a computer system enabling information according to graphical representations, such as drawings or handwriting drawn on the array, to be entered by the user. The touch input element in this case can be a hand-held stylus. A high resolution array can also be used, for example, as a fingerprint sensor which detects the position of ridges and valleys in a person's fingerprint.

An example of the above kind of touch sensing device and comprising a two-dimensional array of sensing elements is described in EP-A-0397244 in which each element comprises a first conductive layer that is supported on a substrate of glass and a second conductive layer that is common to all sensing elements and is carried on a flexible film overlying all the elements which is supported in spaced relationship over the first conductive layers by means of appropriately positioned discrete spacer elements disposed between the support and the film which maintain a predetermined gap between the layers. Upon touching, the pressure of the touch input causes the second layer to move into contact with the first layer of a sensing element at the point of touching. In this particular example, the first conductive layer comprises one side of a capacitor which is periodically charged and which is discharged upon the second conductive layer, which is held at a reference potential contacting the first conductive layer thereby enabling the touch input to be detected. The use of a carrier film for the second conductive layer and the need to provide spacing elements at predetermined locations to maintain the conductive layers in a normally spaced relationship both add to the complexity of the construction of such a touch sensing device.

In another known example of a touch sensing device array, a first set of parallel conductive strips is carried on an insulating support and a second set of conductive strips extending transverse to the strips of the first set is carried on a deformable membrane extending over, and spaced from, the first set. In response to input pressure as a result of touching, the membrane is locally deformed to bring a portion of a strip of one set, adjacent the point of touching, into contact with a strip of the other set in the manner of a switch whereby the x–y coordinates of the input can be determined. Instead of relying on electrical contact between the first and second conductive layers of the touch sensing device to detect a touch input, a capacitance sensing approach can be adopted in which a touch input is detected according to a change in the capitance of a touch sensing element resulting from one conductive layer being physically displaced relative to the other conductive layer due to touching. The membrane is typically suspended over the first set of strips by supports positioned around the periphery of the array so that the sets of strips are in close proximity. Consequently, the gap between the two sets of strips may not be uniform over the area of the array, particularly if the array is used horizontally in which case there is a tendency for the membrane to droop, so that erroneous operation can occur not only when capacitance sensing is used but also when contact sensing is used, especially if the array is subjected to vibration or mechanical shocks. Due to the use of a film or membrane separate from the support in the above kinds of touch sensing devices, there is a consequent need for an assembly operation in their manufacture. When used in conjunction with an article, for example as an overlay for a liquid crystal display device, then the assembly operation entailed in providing at least the film or membrane of the touch sensing device complicates manufacture.

OBJECTS AND SUMMARY OF THE INVENTION

It is an object of the present invention to provide improved touch sensing devices and arrays of touch sensing elements which can be manufactured simply and reliably. It is another object of the present invention to provide a touch sensing device which is suitable for use in conjunction with a device such as a display panel fabricated using thin film technology and which is capable of being provided simply and conveniently using compatible technology.

According to one aspect of the present invention, there is provided a method of making a touch sensing device having a plurality of touch sensing elements each comprising first and second overlapping electrically conductive electrodes carried on a common support and in which the second conductive electrode is spaced from the first conductive layer and is displaceable towards the first conductive layer in response to a touch input, which is characterized by providing on the support a multi-layer thin film structure comprising a first layer of electrically conductive material, a layer of insulating material extending over the first layer and a second layer of electrically conductive material extending over the insulating layer and which is provided at predetermined regions with apertures extending therethrough, and performing an etching process to remove via said apertures at each region an underlying part of the insulating layer between the first and second layers at said region to leave the second conductive layer extending over the first conductive layer and supported in spaced relationship to the first conductive layer at that region by the insulating layer extending theraround to form a touch sensing element at each region.

According to a second aspect of the present invention, there is provided a touch sensing device having a plurality of touch sensing elements each comprising first and second overlying electrically conductive thin film layers carried on a common support with the second layer being spaced from the first layer and displaceable towards the first layer in response to a touch input, characterized in that the second conductive layer has an apertured region at each sensing element location and is supported around the periphery of the region by a layer of insulating material carried on the support and which determines a space between the second and first conductive layers into which the apertured region of the second conductive layer inwardly of its periphery is displaced in response to a touch input.

The method of making a touch sensing device according to the present invention has the advantages that it is comparatively simple and reliable while also being inexpensive. Conventional thin film technology as employed in the field of large area electronics, for example, active matrix display devices, can be used . Standard thin film deposition techniques can be used to provide each layer in succession on the support. The apertures in the second conductive layer can be formed by photolithographic definition techniques. The apertures facilitate removal of the insulating layer separating the conductive layers by underetching, leaving a gap, i.e. a void, between the conductive layers. The spacing between the second conductive layer,which is then supported by the remaining part of the insulating layer which extends around the apertured region, and the first conductive layer is determined by the thickness of the insulating layer which can be readily and accurately controlled. The need for the second conductive layer to be carried on a supporting film or the like separate from the support is avoided. Also, the need to dispose accurately discrete spacer elements between such a film and the support at predetermined locations is removed by virtue of the second conductive layer being formed on, and supported by, the insulating layer and carried on the support rather than being carried on a separate film. Moreover, a comparatively robust and easily fabricated touch sensing device is obtained.

In addition to enabling the underlying region of the insulating layer to be removed conveniently the apertures in the second conductive layer also serve in the completed touch sensing element to enhance the flexibility of that region of the second conductive layer.

A considerable amount of freedom in selecting the materials for the device is permitted. The conductive layers can be formed of metal, for example chromium or aluminium, or doped semiconductor material such as n type amorphous or polycrystalline silicon, or even combinations thereof as stacked sub-layers. If transparency is desired the conductive layers may be formed of ITO. The insulating layer may be formed, for example, of silicon oxide or silicon nitride material. The support may be rigid, for example, of glass, or flexible using a plastics material such as polyimide, enabling the device to be mounted for subsequent use on a curved rather than a flat surface and conform to the contour of that surface. All these materials are compatible with thin film processing technology.

The touch sensing device and its method of fabrication is particularly attractive if it is to be applied to, or integrated with, another large area electronics device fabricated using thin film technology such as particularly an active matrix liquid crystal display panel. If used in the manner, for example, of an LC display panel overlay, then the touch sensing device can be provided very simply and conveniently using the same kind of fabrication processes and the same equipment as is used for the panel. A typical LC display panel comprises two insulating substrates, for example of glass, on one of which there is provided picture element electrodes and an active matrix array comprising switching elements associated with the picture element electrodes, for example TFTs using polysilicon or amorphous silicon, or thin film diodes, and one or more sets of address conductors all of which are formed by using thin film technology by depositing and defining thin film layers of conductive, insulating and semiconductive materials. The touch sensing device can be fabricated easily in a similar manner using the same equipment. The materials employed would then depend on the nature of the display panel and the materials used for the panel and would be selected from those materials for simplicity of manufacture. Advantageously, the support used for the touch sensing device can comprise a substrate of the display panel. Alternatively, the support may be of a separate support which is subsequently attached to the display panel, for example, overlying one of the panel's subtrates, while still allowing the commonality of materials, production equipment and processes to be retained. If the touch sensing device is to be used with such a display as a keypad rather than display overlay, then the device is preferably fabricated simultaneously with the active matrix array on one substrate of the panel outside that area of the substrate which is occupied by the active matrix array and which is to be covered by the second substrate of the panel, for example, towards an edge region of the substrate, so that after assembly of the two substrates, the touch sensing elements are operable by a user.

Preferably, the second conductive layer is covered by a thin film of flexible insulating material, such as polyimide applied by spinning or other known technique, or silicon oxide or nitride to seal and protect the device.

The touch sensing elements can readily be fabricated on the common support by standard thin film technology processes from common conductive and insulating layers produced on the support and using conventional patterning processes, for example photolithographic definition or perhaps laser scribing, to determine the required shape and layout of the touch sensing elements.

Either or both of the first and second conductive layers may be patterned, e.g. by photolithographically defining a deposited conductive layer to provide a physically, and electrically, separate portion at each said region which includes a connection part extending away from the region. In a simple form of device comprising a small number of sensing elements, both of the conductive layers may be patterned in this way so that electrical connection can be achieved to each element individually via the associated connection parts. Where, for example, larger numbers of closely spaced sensing elements are involved, then one of the conductive layers may be patterned to provide said separate portions while the other conductive layer is common to, and interconnects, the sensing elements. The other conductive layer could be shaped so as to limit its area on the support to correspond with the overall area occupied by the sensing elements.

In, for example, a linear array of sensing elements a common conductive layer may be used to provide one conductive layer of the elements and integral interconnections between adjacent touch sensing elements by appropriate patterning, such patterning being prior to the deposition of the insulating layer in the case of the first conductive layer being used. A touch sensing device comprising sensing elements arranged in, for example, two or more rows could be produced in this way. However, in a preferred embodiment for providing a large number of elements in a two dimensional array, the first and second conductive layers may be patterned to form respective first and second sets of strips extending over the support in first and second directions and crossing one another with the apertured regions of the second conductive layer being provided in the strips of the second set at the cross-overs. Thus, a two dimensional matrix array of sensing elements is obtained with the first and second conductive layers of adjacent elements in the first and second directions being interconnected by intermediate portions of the respective strips. In a device comprising a two dimensional array, the touch sensing elements are preferably arranged in a row and column matrix array with the first conductive layers of the sensing elements in a row comprising respective portions of a common conductive strip of one set and the second conductive layers of the sensing elements in a column comprising respective portions of a common conductive strip of the other set. Such an array can be fabricated very simply by providing on the support a first set of conductive strips extending parallel to one another and a second set of conductive strips extending parallel to one another and transversely of the first set with a layer of insulating material disposed between the two sets, and thereafter removing a region of the insulating material at each of the cross-overs through the apertured region in the upper strip so as to form a touch sensing element at each cross-over region. In operating such a device, the first set of strips may be connected to a scan circuit which selects, for example, each row of touch sensing elements in succession by applying a selection voltage signal to each strip in turn, and the second set of conductive strips may be connected to a sense circuit for sensing which of the touch sensing device in the selected row is being touched, either by the sensing elements operating in a switch mode or in a variable capacitance mode.

When the second conductive layer is to be patterned, then preferably such patterning takes place after the etching process to remove insulating material beneath the apertured regions so that the layer of conductive material constituting the second conductive layer protects other areas of the insulating layer during this process.

The size, shape, and spacing of the touch sensing elements can be varied according to the intended use of the device. For an X–Y matrix of elements for use together with a stylus in the manner of a graphics tablet, for example, the elements may be square or circular and around 200 micrometers across, or perhaps smaller for high resolution applications such as fingerprint sensing. For keypad purposes and the like, where the element is to be operated by a user's finger, then a comparatively large area sensing element, for example, 1 cm across or perhaps larger would be desirable. In this case, the apertures in each apertured region of the second conductive layer may be arranged to divide the region into a plurality of adjacent apertured sub-regions such that, following the etching process, portions of the insulating layer are left between adjacent sub-regions. The sensing element then comprises in effect a plurality of sub-elements which, by virtue of their common first and second conductive layers, are electrically in parallel and in which the second conductive layer is additionally supported over the first conductive layer at places away from the periphery of the sensing element by the remaining portions of the insulating layer. Depending on the arrangement of the apertures used, these remaining portions may be in the form of pillars or walls.

BRIEF DESCRIPTION OF THE DRAWINGS

Embodiments of touch sensing devices and methods of fabricating such in accordance with the present invention will now be described, by way of example, with reference to the accompanying drawings, in which.

It should be understood that the Figures are merely schematic and are not drawn to scale. In particular certain dimensions such as the thicknesses of layers or regions may have been exaggerated while other dimensions may have been reduced. The same reference numerals are used throughout the Figures to indicate the same or similar parts.

DESCRIPTION OF THE PREFERRED EMBODIMENTS

Figure 1:
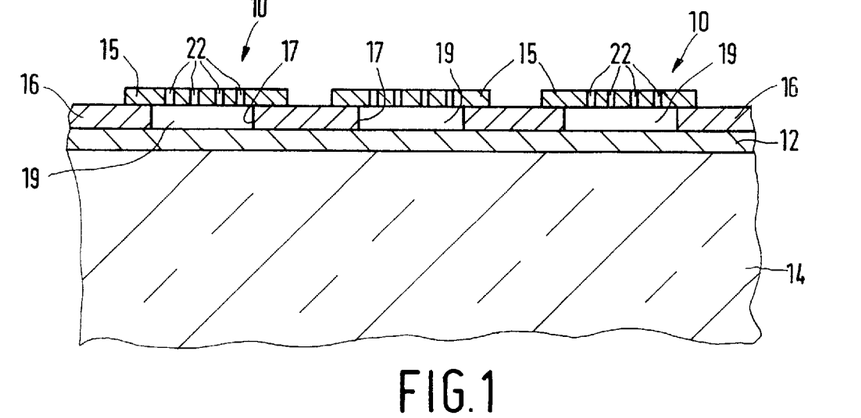
FIG. 1 is a schematic cross-sectional view through a part of one embodiment of a touch sensing device according to the invention.
Figure 2:
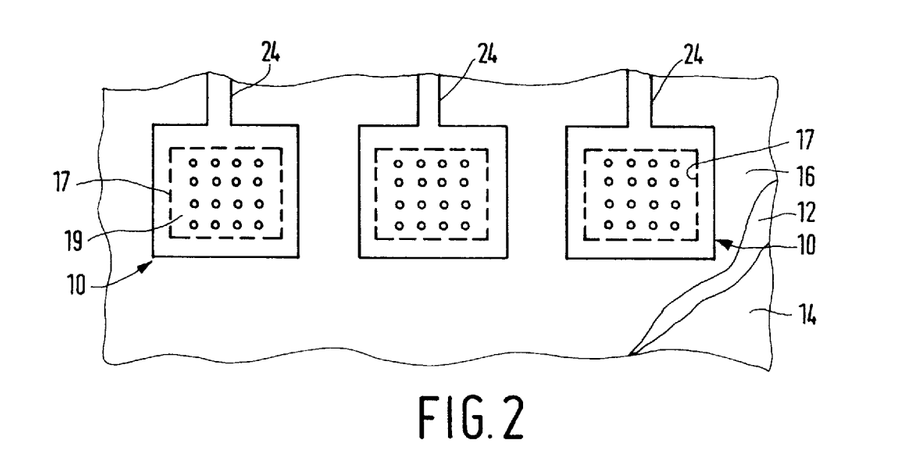
FIG. 2 is a schematic plan view of the touch sensing device of FIG. 1.

Referring to FIGS. 1 and 2, the touch sensing device comprises a linear array of individually-operable touch sensing elements 10, only three of such are shown. The device has a first thin film electrically conductive layer 12 disposed directly on an insulating support 14, for example of glass, and a second electrically conductive thin film layer 15 which overlies, and is supported in spaced relationship above, the layer 12 by an intermediate thin film layer 16 of electrically insulating material carried on the support 14. In this embodiment, the layer 12 extends over the support surface to cover the overall area occupied by the elements 10, whereas the second conductive layer 15 is patterned to define discrete, physically and electrically separate, rectangular areas at each sensing element location.

The first and second conductive layers 12 and 15 are of, for example, metal, such as aluminium or chromium, ITO, or doped amorphous or polycrystalline silicon. The discrete portions of the layer.15 are supported completely around their periphery by the insulating layer 16 which terminates slightly inwards of the periphery of the portion such that its edge 17 defines a generally rectangular space 19 between the layers within the boundary of the layer 15. An inwards region of each discrete portion of the layer 15 overlying the space 19 is perforated, having a rectangular, row and column, array of regularly-spaced apertures 22, extending therethrough, which array covers a substantial part of the portion.

Electrical connection to each discrete portion of the layer 15 is achieved via connection strips 24 which are formed continuously, and integrally, with the layer 15 as extensions which extend away from the sensing element over the surface of the insulating layer 16.

The touch sensing element 10, comprising the overlapping layers 12 and 15 spaced apart by the layer of insulating material with an intervening gap are intended to be operated in a switch sense mode. The thickness of the insulating layer is selected so that, having regard to a typical touch input pressure, for example, from a finger or stylus, the layer 15 of a sensing element, whose flexibility is enhanced by virtue of the apertures 22, is displaced inwardly of the gap to physically contact the underlying layer 12, thereby electrically connecting the layers 12 and 15 in the manner of a switch. Upon removal of the touch input pressure, the layer 15, being resilient, returns to its original, open switch, position as shown in FIG. 1. A touch input to the elements is detected simply by applying a voltage to the layer 12 and monitoring the voltage on the connection strips 24. By operating the sensing element in the manner of a switch, positive and reliable indications of touch inputs are obtainable.

The device could instead be operated in a capacitive sense mode. In this mode, a change in the capacitance of the structure comprising the layers 12 and 15 and the intervening air gap 19 in response to a touch input to the layer 15, whose pressure causes the layer 15 to deform and flex inwardly towards the layer 12, is sensed using an appropriate sense circuit known in the art and connected to the layer 12 and the connection strips 24 to provide an output accordingly. Upon removal of the touch input, the layer 15 returns to its original position. For this operation the thickness of the insulating layer 16, and thus the height of the gap 19, is selected so that upon normal touch input pressures the layer 15 is displaced through only a part of the height of the gap.

The touch sensing device is fabricated in a very simple manner using standard thin film deposition and definition techniques. Firstly, planar layers of conductive material, insulating material and conductive material are deposited in succession, using a CVD or sputtering process, on the surface of the support 14, each to a uniform thickness, to produce a multi-layer structure. The materials of the conductive layers, which constitute the first and second conductive layers 12 and 15, are as described previously. The insulating layer is of, for example, silicon oxide, silicon nitride, or polyimide. The rectangular arrays of apertures 22 are then defined in the layer 15 at predetermined locations using a photolithographic process. Following this, the structure on the support is subjected to a controlled etching operation using a selective etchant which penetrates through the apertures and removes, by under etching, an area of the insulating layer 16 between the layers 12 and 15 at each region to form the gaps 19. By appropriate control of this underetching process and with a suitable selection of the size and spacing of the apertures 22, a substantially rectangular gap 19 is formed at each region whose dimensions are slightly greater than those of the aperture arrays.

Following this underetching, the layer 15 is patterned using a further photolithographic process to leave individual portions which respectively overlie the gaps 19 and whose dimensions are slightly greater than those of the gaps so that they are supported around their peripheral areas by the insulating layer 16, as shown in FIG. 1. This definition process is used to form at the same time the integral connection parts 24 extending away from each portion.

In an alternative method, the arrays of apertures 22 and the patterning of the layer 15 into individual, electrically separate, portions could perhaps be accomplished in the same photolithographic process. However, it will be appreciated that in this case areas of the surface of the insulating layer 16 intermediate the apertured regions will be exposed to the etching process when underetching the gaps 19 and consequently the areas of the individual portions of the layer 15, and their integral extensions, should be increased to allow for the effects of underetching at their edges when carrying out this process.

By way of example of typical layer thicknesses used, the thickness of the conductive layers 12 and 15 may be around 0.1 to 1 micrometres, and the thickness of the insulating layer 16 may be around 0.1 to 0.5 micrometres. The number and configuration of the apertures 22 in each array are selected having regard, inter alia, for the thickness and etching characteristics of the material of the insulating layer 16. A row and column array of sixteen apertures is shown in the Figures, but it should be understood that this is for illustrative purposes only. Generally, the apertures 22 will have a diameter corresponding to the thickness of the insulating layer 16, and the distance between adjacent apertures in the row and column array will be approximately twice their diameter. The size and pitch of the apertures should also take into account the desired mechanical flexing characteristics of the portions of the layer 15 in subsequent use of the touch sensing elements. In this respect, therefore, the apertures should not be too close together otherwise the structural integrity of the portions could be affected. The overall size of the sensing element can be varied. If intended to be operated by a user's finger, then the element, or more particularly its gap, may be around 1 cm. across.

Although only a linear array of touch sensing elements is illustrated in FIGS. 1 and 2, it will be appreciated that two or more rows of elements could easily be provided on the same support all sharing a common conductive layer 12 and having their own respective connection parts 24. If the touch sensing elements are to occupy only a part of the total area of the support 14, then the layer 12 could be patterned prior to the deposition of the insulating layer 16 so as to further restrict its area to correspond with that occupied by the elements. Such patterning may also be used, if desired, to shape the area of the layer 12 to conform with the element locations with connection portions between adjacent elements, rather than being continuous.

Depending on the intended application of the touch sensing device, the plurality of elements could be arranged independently of one another with the layer 12 being patterned into discrete portions in a similar manner to the layer 15 so that each individual sensing element is electrically isolated and has its own respective connection strips from both layer 15 and layer 12 via which it is addressed. For example, if used as a user interface for command input by finger to equipment, then only a small number of touch sensing devices may be needed.

Figure 3:
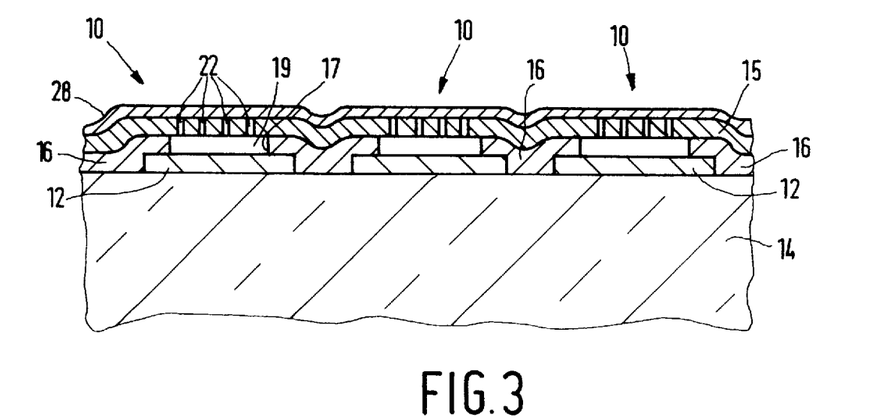
FIG. 3 is a schematic cross-sectional view through a part of a second embodiment of touch sensing device according to the invention.

FIG. 3 illustrates in cross-section a part of another form of touch sensing device similar in many respects to that of FIGS. 1 and 2, but which is produced using a modified method. In this, the first conductive layer 12 deposited on the surface of the support 14 is patterned using a photolithographic process prior to the deposition of the insulating layer 16 to define individual portions at each intended sensing element location with each portion having an integral connection part, corresponding to the part 24 in the previous embodiment. The insulating layer 16 and second conduction layer 15 are then deposited in succession to form the multi-layer structure following which the arrays of apertures 22 are defined in the layer 15 at regions overlying the individual portions of the layer 12. The insulating material between the aperture regions in the layer 15 and the underlying portions of layer 12 are then removed by the underetching process to leave the structure, as shown in FIG. 3, in which the layer 15 constitutes the common conductive layer for the sensing elements rather than the layer 12, as in the previous embodiment.

Figure 4:
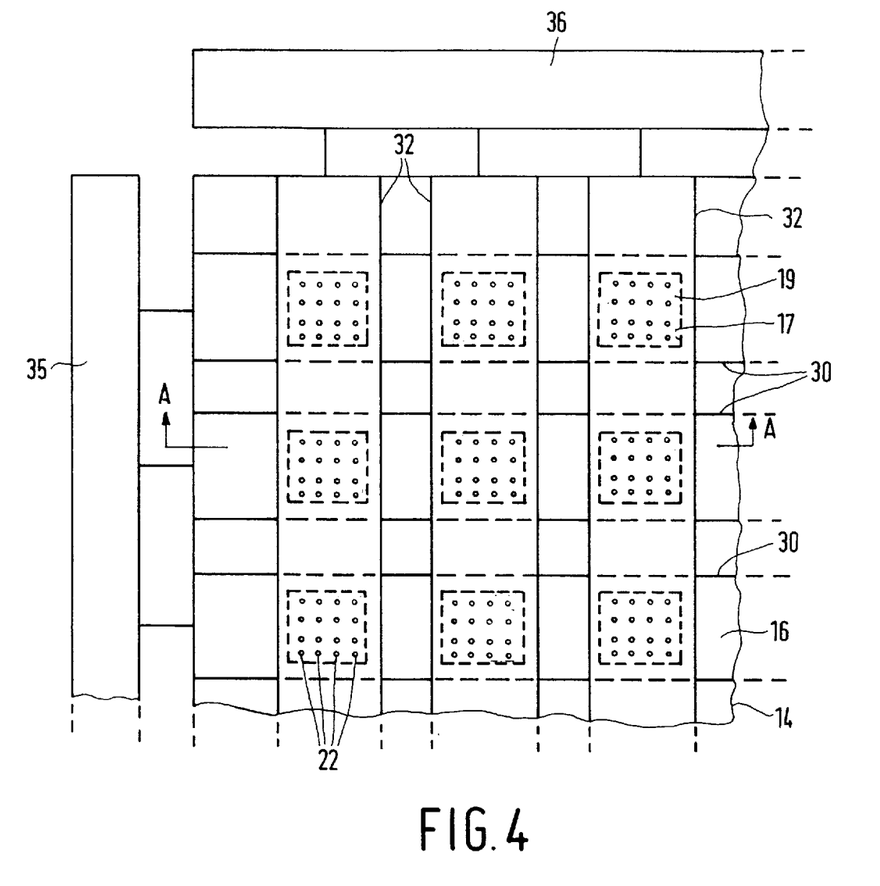
FIG. 4 is a schematic plan view of a part of a third embodiment of a touch sensing device according to the invention having a two dimensional, X–Y, array of touch sensing elements.
Figure 5:
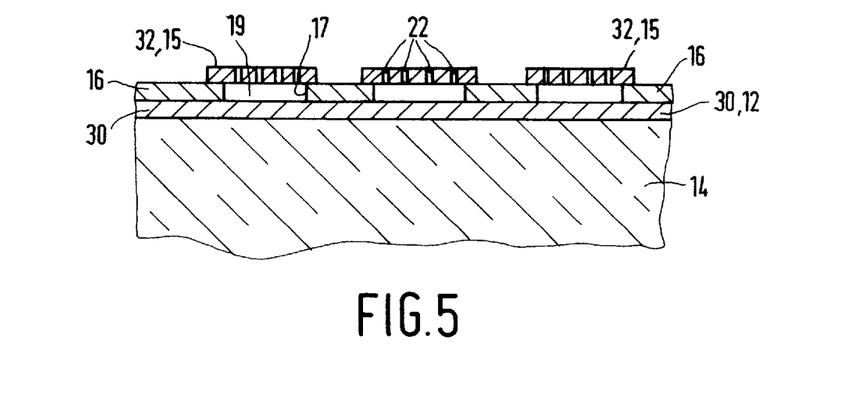
FIG. 5 is a schematic cross-section along the line A—A in FIG. 4.

In applications requiring comparatively large numbers of touch sensing device elements in a two-dimensional array, the elements may be interconnected so as to simplify the addressing and also to allow higher densities to be achieved for applications needing higher resolution. FIG. 4 illustrates part of another embodiment of the invention comprising a two dimensional array of individually operable touch sensing elements arranged in a row and column (X–Y) matrix. In this embodiment, the layers 12 and 15 of the touch sensing elements 10 are divided respectively into two sets of conductive strips extending transversely to one another over the insulating support 14, with the touch sensing elements being located at respective intersections between the strips of the two sets. The first set of strips comprises a planar array of parallel row conductors 30 carried on the surface of the support 14. Overlying this set and the intervening areas of the support 14, the layer 16 of insulating material is provided upon which the second set of strips, comprising a planar array of parallel column conductors 32, is carried. The cross-overs between each row and column conductor determine respective touch sensing elements 10, whose structure, depicted in cross-section along the line A—A is shown in FIG. 5, is generally similar to that of the embodiment of FIGS. 1 and 2 and comprises the layer 15 overlying the layer 12 and supported around its periphery spaced from the layer 12 by insulating material 16. Thus, the conductive layer 12 of the elements in a row comprise respective portions of the row conductor 30, and the conductive layer 15 of the elements in one column comprise respective portions of a column conductor 32.

The array of elements is operated by matrix addressing and to this end the sets of row and column conductors 30 and 32 are connected, as shown in FIG. 4 by way of example, to a scan drive circuit 35 and a detection circuit 36 respectively. The circuit 35 scans each row conductor 30 successively with a selection pulse signal, comprising a predetermined voltage, and the detection circuit 36 monitors the voltage on each of the column conductors 32. If a touch input is present at a particular touch sensing element 10 in the selected row, the respective row and column conductors associated with that element are in effect short circuited as a result of the layer 15 contacting the layer 12 in the element. Consequently, the circuit 36 detects the resulting voltage appearing on the column conductor 32 and provides an output which is indicative of the location of the touched element. Each row conductor 30 is scanned in turn and the output on the column conductors 32 is monitored in this fashion so that in one complete scan field any touched element in the array is detected. The operation is repeated in successive scan fields. The array is suitable for use as a graphics tablet or other form of user interface for a computer system or the like enabling alpha-numeric or graphical information to be entered by writing over the array using a stylus. The array can be used as an overlay to a display screen with the output from the detector circuit being supplied to the display drive circuit to enable information written onto the array to be displayed on the underlying display screen. For such purposes, the dimensions and spacings of the touch sensing devices in the array are selected having regard to the display pixel size and spacing. Each touch sensing element may correspond to an individual pixel or a respective group of pixels. The array could also be used as a fingerprint sensor with the elements being arranged to respond to the ridges of a person's fingerprint.

Fabrication of the array is generally similar to that described previously. A layer of conductive material is deposited to a uniform thickness over the surface of the support 14, for example of glass, and patterned photolithographically to leave the set of row conductors 30. A layer 16 of insulating material, for example silicon oxide or silicon nitride, is then deposited to a predetermined uniform thickness completely over the support to cover the row conductors and the exposed areas of the support surface. A second layer of conductive material is then deposited to a uniform thickness over the surface of the insulating layer 16 and then subjected to a photolithographic process to form a rectangular array of apertures 22 extending therethrough at predetermined regions where overlying the row conductors. The thicknesses of the layers are as described previously. The position and size of this aperture array is such that its periphery lies within the edges of the row conductors 30 by a predetermined amount. As before, only a comparatively small number of apertures are shown. In practice, considerably more apertures may be used. Thereafter the structure is subjected to an etching process in which a selective etchant penetrates through the apertures 22 at each region and removes a corresponding underlying region of the insulating layer to create the voids 19. Etching of the insulating material will occur laterally as well as vertically and because of this, the boundary of the aperture array is selected in relation to the row conductor width such that the vertical walls of the insulating layer surrounding a void at each region lie inwardly of the edges of the associated row conductor 30. Thereafter, the layer 15 is patterned to form the set of column conductors 32 with each conductor 32 extending over a column of apertured regions and having a width slightly greater than the width of the gaps 19 so that conductors are supported at their edges at each aperture region by insulating material adjacent the gap 19.

The strips constituting the row and column conductors 30 and 32 need not be of constant width. Their width in the regions between adjacent sensing elements may be reduced.

Materials other than glass can be used for the support 14. The material need not necessarily be rigid. For example, the support could comprise a polyimide sheet. A degree of flexibility would then be afforded to the array enabling it to be attached to a curved surface, for example the surface of a CRT display screen, and conform with that surface.

The materials used for the different layers can be as previously described. If the array is to be used as a display overlay, then substantially transparent materials, such as ITO for the conductive layers and silicon oxide or silicon nitride for the insulator layer, would be employed.

In the case of any of the above described touch sensing devices being used as an overlay to an electro-optical matrix display device such as an active matrix liquid crystal display panel, then a substrate of the panel may be used for the support 14 so that the array is formed on, and comprises an integral part of, the panel. This would involve fabricating the touch sensing device on the side of the substrate opposite to that on which the active matrix array, comprising the picture element electrodes, switching devices and address conductors, is provided or, alternatively, on the other, passive, substrate of the panel.

Figure 7:
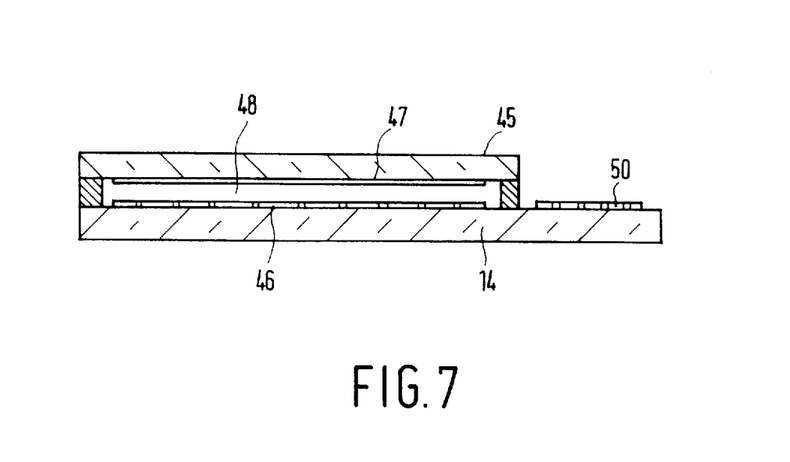
FIG. 7 shows schematically in cross-section an integrated touch sensing device and electro-optical display panel.

If the touch sensing device is to be used in the manner of, for example, a keypad rather than a display overlay, then, conveniently, the device can be fabricated simultaneously with the active matrix array on one side of a substrate outside the area of the substrate which is occupied by the active matrix array and which is to be covered subsequently by the other substrate of the panel. FIG. 7 schematically illustrates in section an example of such an integrated display panel and touch sensing device. The display panel comprises first and second substrates 14, 14 and 45. The substrate carries on a part of its surface the active matrix array, comprising picture element electrodes, switching devices and address conductors, indicated in FIG. 7 by 46, while the substrate 45, carrying counter electrodes 47 overlying the array 46, is spaced from the array 46 with liquid crystal material 48 sealed therebetween. The touch sensing device, indicated at 50, is formed at an edge region of the surface of the substrate 14 outside the area covered by the substrate 45.

In order to prevent dust or other contaminants from entering the gaps 19 of the touch sensing elements 10 and affecting their operation, a thin film of flexible, insulating material, such as a polyimide, silicon oxide or silicon nitride may be deposited completely and continuously over the array after producing the sensing elements to form a seal and protect the structure against physical damage, as shown, for example, at 28 in FIG. 3.

Figure 6:
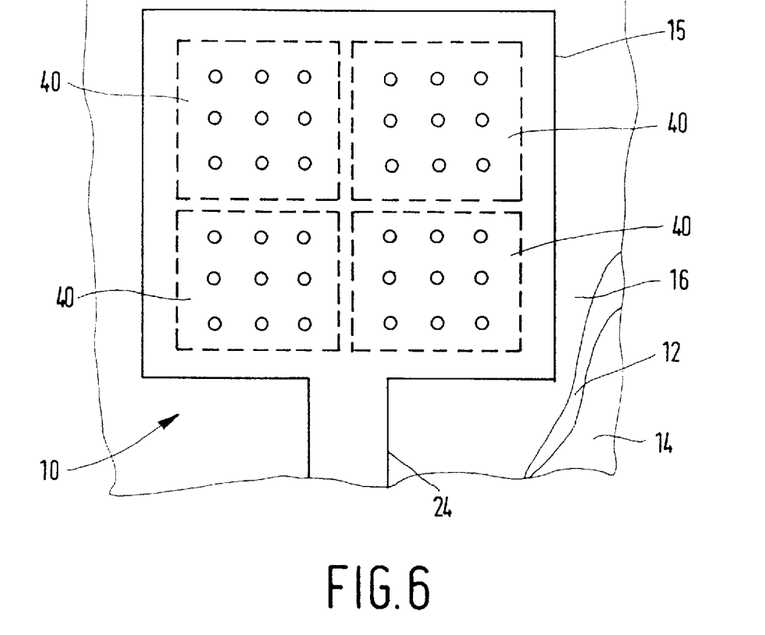
FIG. 6 is a schematic plan view of a modified form of touch sensing element.

It will be appreciated that the dimensions of a touch sensing element can be varied and will be dependent on the intended application. In the case of, for example, a display overlay or graphics tablet operable with a stylus or a fingerprint sensor then a high density stylus or a fingerprint sensor then a high density of small size elements,for example around 200 micrometers across or smaller, would be desirable. In the case of a user control interface intended to be operated by a user's finger, then comparatively large sensing elements, for example around 1 cm across, or larger, would be required. The layer thicknesses and materials employed will have an effect on the range of element sizes possible. To provide a comparatively large size of element then an element sub-division technique can be adopted. FIG. 6 shows in plan view a modified form of a sensing element of the kind used in the embodiment of FIGS. 1 and 2 using this approach. Rather than using a row and column array of regularly spaced apertures 22 at the apertured region of the layer 15, the apertures in the array are arranged in sub-groups, each having a plurality of regularly-spaced apertures defining sub-regions 40 and with adjacent sub-regions being spaced slightly from one another. In the example of FIG. 6, four sub-regions 40 are involved. The spacing between the sub-regions is selected such that following the underetching process insulating material beneath each sub-region is removed, but portions of insulating material remain between the sub-regions extending between the layers 12 and 15 whereby the layer 15 is supported not only around its periphery but also at areas between the sub-regions. The sensing element thus obtained in effect consists of four sub-elements in parallel. A user touching the sensing element with a finger would then cause one or more of these sub-elements to be operated. Depending on the required size of the element, then more than four sub-elements could be used. The number of apertures in each sub-region will be varied accordingly. In this example, rectilinear walls of insulating material are left following the underetching process separating the sub-elements. In a modification, however, the sub-regions may be designed, by appropriate lay-out of their apertures in arrangements other than rectangular sub-regions, so that as a result of the underetching process discrete pillars rather than walls are left at spaced intervals over the area of the sensing element.

With regard to all all the embodiments described, the touch sensing device is intended to be operated in a capacitive sensing mode rather than a switching mode, a further layer of insulating material may be included in the multilayer structure, either between the first conductive layer 12 and the insulating layer 16 or between the insulating layer 16 and the second conductive layer 15 in order to prevent the second conductive layer 15 from electrically contacting the first inductive layer 12 in a sensing element 10 in response to a touch input. Such a further insulating layer is preferably provided as a single, continuous, layer extending over the area of the sensing element array, and would be of a material different from that of the layer 16 so that, using an appropriately selective etchant, it is not removed at the sensing element locations as a result of the underetching process. It may be possible instead in certain circumstances to control the underetching of the layer 16 so as to leave a part of this layer at the bottom of each gap 19, but this would be difficult to achieve reliably. If a further insulating layer is provided between the layers 16 and 15, then, obviously, the apertures 22 would be defined so as to extend through this layer as well as through the layer 15.

Although in all of the above embodiments rectangular sensing elements have been described, it will be appreciated that other shapes of sensing elements, for example circular, could be provided by appropriately changing the shape of the array of apertures 22.

From reading the present disclosure, other modifications will be apparent to persons skilled in the art. Such modifications may involve other features which are already known in the field of touch sensing devices and thin film processing and which may be used instead of or in addition to features already described herein.

I claim:

1. A method of making a touch sensing device having a plurality of touch sensing elements
    each touch sensing element comprising first and second overlapping electrically conductive layers carried on a common support and
    in which the second conductive layer is spaced from the first conductive layer and is displaceable towards the first conductive layer in response to a touch input,
    characterized by
    providing on the common support a multi-layer thin film structure comprising:
        a first layer of electrically conductive material,
        a layer of insulating material extending over the first conductive layer and
        a second layer of electrically conductive material extending over the insulating layer and which second conductive layer is provided at predetermined regions with apertures extending therethrough, and
    performing an etching process to remove via said apertures at each region an underlying part of the insulating layer between the first and second conductive layers at said region to leave the second conductive layer extending over the first conductive layer and supported in spaced relationship to the first conductive layer at that region by the insulating layer extending therearound to form a touch sensing element at each region.

2. A method according to claim 1, characterized in that said first conductive layer is patterned prior to providing the insulating layer to define a physically separate portion at each said region which portion includes an integral connection part extending away from the region.

3. A method according to claim 1, characterized in that said second conductive layer is patterned to define a physically separate portion at each said region which portion includes an integral connection part extending away from the region.

4. A method according to claim 1, characterized:
    in that the first conductive layer is patterned to form a first set of strips extending in a first direction over the common support,
    in that the second conductive layer is patterned to form a second set of strips extending in a second direction over the common support and crossing over the first set with the apertured regions therein overlying respective portions of the first set of strips at the cross-overs whereby a two-dimensional matrix array of sensing elements is obtained with the first and second conductive layers of adjacent sensing elements in the first and second directions being interconnected by portions of the first and second sets of strips respectively.

5. A method according to claim 3, characterized in that the second conductive layer is patterned following said etching process.

6. A method according to claim 1, characterized in that the apertures through the second conductive layer at each region are arranged such that the region is divided into a plurality of sub-regions with each sub-region having apertures and such that following the etching process portions of the insulating layer extending between the first and second conductive layers are left between adjacent sub-regions.

7. A method according to claim 1, characterized in that the common support comprises a substrate of an electro-optical display panel.

8. A touch sensing device having a plurality of touch sensing elements, each touch sensing element comprising:
   first and second overlying electrically conductive thin-film layers carried on a common support,
      with the second conductive layer being spaced from the first conductive layer and displaceable towards the first conductive layer in response to a touch input,
   wherein
   the second conductive layer has an apertured region at each sensing element location and
   said second conductive layer is supported around the periphery of the apertured region by a layer of insulating material carried on the common support
   which insulating layer determines a space between the second and first conductive layers
   into which space the apertured region of the second conductive layer is displaced in response to a touch input.

9. A touch sensing device according to claim 8, wherein at least one of the first and second conductive layers is patterned such that each sensing element comprises a discrete physically and electrically separate portion, and each discrete portion includes a connection part extending away from the respective sensing element.

10. A touch sensing device according to claim 8, characterized in that the device includes
   a first set of conductive strips extending over the common support in a first directions, and
   a second set of conductive strips extending over the common support in a second direction and crossing the first set of strips,
   which strips constitute the first and second conductive layers respectively with the sensing elements being located at the cross-over regions.

11. A touch sensing device according to claim 8, wherein each said apertured region of the second conductive layer comprises a plurality of adjacent apertured sub-regions and a portion of said insulating layer extending between the first and second conductive layers is located between adjacent sub-regions.

12. A touch sensing device according to claim 8, wherein the second conductive layer is covered by a protective layer of flexible insulating material.

13. A touch sensing device according to claim 8, characterized in that the device is combined with an active matrix liquid crystal electro-optical display panel and said common support comprises a substrate of the electro-optical display panel.

14. A touch sensing device according to claim 13, wherein the touch sensing device is provided on the substrate of the display panel outside the area of the substrate which is occupied by picture elements of the display panel and which is covered by a second substrate of the display panel.

15. The touch sensing device according to claim 8 wherein apertures in said apertured regions form air passages through the second conductive layer, and
   the insulating layer is patterned to form a plurality of air gaps with each air gap aligned with an aperture in a respective apertured region such that each air gap communicates directly with the air passage in its aligned aperture.

16. The touch sensing device according to claim 8 wherein a top surface of the insulating layer contacts and supports a bottom surface of the second conductive layer, and
   the insulating layer includes a plurality of air gaps with each air gap aligned with an aperture in a respective apertured region of the second conductive layer.

17. The touch sensing device according to claim 8 wherein each apertured region includes multiple apertures, and
   the insulating layer includes a plurality of air gaps with each air gap aligned with the multiple apertures in its respective apertured region of the second conductive layer.

18. The touch sensing device according to claim 8 wherein the insulating layer includes a plurality of discrete rectangular air gaps aligned with respective apertured regions and the dimensions of the rectangular air gaps are slightly greater than those of their respective aligned apertured regions.

19. The touch sensing device according to claim 8 wherein the second conductive layer comprises a resilient metal material such that an apertured region is displaced into said space inwardly of its periphery in response to the touch input, and
   the thickness of the insulating layer determines said space between the second and first conductive layers.

20. The touch sensing device as claimed in claim 8 wherein the second conductive layer is formed on and is supported by the insulating layer,
   the insulating layer is supported on the first conductive layer, the insulating layer being in contact with both the first and second conductive layers, and
   apertures in the apertured regions have diameters corresponding to the thickness of the insulating layer and the distance between adjacent apertures is approximately twice their diameter.

21. The touch sensing device according to claim 8 further comprising a second insulating layer located between the first and second conductive layers, and wherein the second conductive layer comprises a thin flexible material.

* * * * *